United States Patent
Latif et al.

(10) Patent No.: US 12,518,075 B1
(45) Date of Patent: Jan. 6, 2026

(54) DRILLING DECISION SYSTEM AND METHOD OF MULTIMODAL LITHOFACIES PREDICTION AND DECISION-MAKING

(71) Applicant: PRINCE MOHAMMAD BIN FAHD UNIVERSITY, Dhahran (SA)

(72) Inventors: Ghazanfar Latif, Dhahran (SA); Ghassen Ben Brahim, Dhahran (SA); Abul Bashar, Dhahran (SA); Nazeeruddin Mohammad, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/240,574

(22) Filed: Jun. 17, 2025

(51) Int. Cl.
*G06F 30/28* (2020.01)

(52) U.S. Cl.
CPC .................... *G06F 30/28* (2020.01)

(58) Field of Classification Search
CPC ...... G06F 30/28; G06F 30/27; E21B 2200/22; G06N 3/4064
See application file for complete search history.

(56) References Cited

U.S. PATENT DOCUMENTS

| | | | |
|---|---|---|---|
| 12,066,586 B2 * | 8/2024 | Li | E21B 49/005 |
| 2020/0301036 A1 * | 9/2020 | Ramfjord | E21B 7/04 |
| 2022/0351037 A1 * | 11/2022 | Li | G01N 21/3563 |
| 2023/0145880 A1 * | 5/2023 | Solum | G06F 18/2431 |
| | | | 382/173 |
| 2024/0168188 A1 | 5/2024 | Hamida et al. | |
| 2024/0241286 A1 * | 7/2024 | Cha | G01V 20/00 |

FOREIGN PATENT DOCUMENTS

CN 117634685 A 3/2024

OTHER PUBLICATIONS

Yuan, Zhenyu, et al. "Hybrid-DNNs: Hybrid deep neural networks for mixed inputs." arXiv preprint arXiv:2005.08419 (2020). (Year: 2020).*

(Continued)

*Primary Examiner* — Ryan F Pitaro
*Assistant Examiner* — Pursottam Giri
(74) *Attorney, Agent, or Firm* — Oblon, McClelland, Maier & Neustadt, L.L.P.

(57) ABSTRACT

A system and method for drilling decision system based on multimodal lithofacies identification includes an image data collection interface for collecting data from digital photos, remote sensing maps and scanning electron microscope (SEM) images. A first convolutional neural network (CNN) model to extract visual features from digital photos, a second CNN model to extract spatial-structural features from the remote sensing maps and a third CNN model to extract microstructural features from the SEM images. An output feature layer combines the extracted features from the first, second and third CNN models to output combined imaging features, a 1-D CNN model extracts the features from the combined imaging features and performs only 1D convolutions. A Neural Network (NN) classifier takes features from the output of 1-D CNN model to predict lithofacies classes with respective composition percentages. An output device configured to output a decision based on the predicted lithofacies classes.

20 Claims, 12 Drawing Sheets

(56) References Cited

OTHER PUBLICATIONS

Imamverdiyev, Yadigar, and Lyudmila Sukhostat. "Lithological facies classification using deep convolutional neural network." Journal of Petroleum Science and Engineering 174 (2019): 216-228. (Year: 2019).*

Yi, Yuchuan, et al. "Sedimentary Facies Identification Technique Based on Multimodal Data Fusion." Processes 12.9 (2024): 1840. (Year: 2024).*

Yuchuan Yi, et al., "Sedimentary Facies Identification Technique Based on Multimodal Data Fusion", MDPI Processes 2024, vol. 12, Issue No. 9, Aug. 29, 2024, 21 Pages.

Ali, Muhammad, et al., "Data-driven lithofacies prediction in complex tight sandstone reservoirs: a supervised workflow integrating clustering and classification models", Geomechanics and Geophysics for Geo-Energy and Geo-Resources. vol. 10, article No. 70, Apr. 9, 2024, 23 Pages.

\* cited by examiner

DRILLING DECISION SYSTEM AND METHOD OF MULTIMODAL LITHOFACIES PREDICTION AND DECISION-MAKING

BACKGROUND

Technical Field

The present disclosure is directed to a method and system for determining or predicting various lithofacies along with their relative percentages and providing a drilling decision made through the analysis of various types of features extracted from several disparate data sources.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Accurate prediction and identification of lithofacies are of significant importance to geophysicists, as lithofacies analysis enhances their understanding of reservoir properties. The understanding is essential for exploring and assessing potential sites based on the mineral composition and physical characteristics of the subsurface rock formations. By reliably predicting lithofacies, geophysicists can better evaluate the quality and volume of a reservoir. Moreover, lithofacies information enables them to identify specific zones or wells with higher potential for producing valuable minerals such as quartz, feldspar, clay minerals, and carbonates, thereby increasing the efficiency and effectiveness of the exploration process.

Experienced geophysicists apply various techniques to characterize lithofacies which focuses on analysis of well log data. Conventionally, various types of data have been analysed separately and manually and automatically evaluated for lithofacies identification. Depending on the type of analysis, the lithofacies associated data are collected from among different sources, such as digital photos, remote sending maps, seismic data, well log data, and scanning electron microscope (SEM) images. Attempting to perform analysis using too many diverse types of data sources quickly becomes too complex to mine dependencies between the different types of data.

The increase in complexity leads to human error by geophysicists when determining relationships and patterns that are important for accurate lithofacies evaluation. Analyzing a large volume of data using conventional manual methods cannot ensure precision and reliability in the evaluation process. Lithofacies cannot be consistently characterized. Accordingly, there is a need for more advanced techniques and tools to effectively analyze and evaluate different types of data from the diverse data sources for Lithofacies identification.

Accordingly, it is one object of the present disclosure to provide methods and systems which fully automate analysis and evaluation of different types of data from disparate data sources and identify lithofacies in order to assist geophysicists which reduces analysis time and human error.

SUMMARY

In an exemplary embodiment, a drilling decision system based on multimodal lithofacies identification is disclosed. The drilling decision system based on multimodal lithofacies identification includes an image data collection interface for collecting data from various sources, including digital photos, remote sensing maps, and scanning electron microscope (SEM) images. The drilling decision system based on multimodal lithofacies identification includes processing circuitry configured with a first convolutional neural network (CNN) model to extract features from the digital photos, a second (CNN) model to extract features from the remote sensing maps, and a third (CNN) model to extract features from the SEM images. The drilling decision system based on multimodal lithofacies identification includes an output feature layer to combine the extracted features from each of the first, second and third CNN models to output combined imaging features. The drilling decision system based on multimodal lithofacies identification includes a one dimension CNN (1-D CNN) model configured to extract further features from the combined imaging features, wherein the 1-D CNN performs only 1D convolutions. The drilling decision system based on multimodal lithofacies identification includes a Neural Network (NN) classifier that takes the further features that are output from the 1-D CNN model to predict lithofacies classes along with respective composition percentages. The drilling decision system includes an output device configured to output an exploration decision based on the predicted lithofacies classes.

The system further includes a waveform signal data collection interface for collecting seismic data and well log data from a potential drilling site and the processing circuitry further configured to derive statistical feature module and extract existing features from the seismic data and the well log data through application of power transform, feature interaction, and wavelets transformation, merge the statistical feature module and the extracted existing features with the combined imaging features to obtain merged features, includes the 1-D CNN model is further configured to extract further features using the merged features.

The system includes the processing circuitry is further configured with a rule-based engine for feature selection with rules to select influential features from the statistical feature module and the extracted existing features, and configured to merge the influential features with the combined imaging features to obtain merged influential features, consists of the 1-D CNN model is further configured for further feature extraction using the merged influential features.

The system includes the 1-D CNN model is further configured to reduce features through flattening and densing layers, and a softmax function. The system includes the output of the NN classifier includes 12 (twelve) pre-defined classes, including Sandstone, Sandstone/Shale, Shale, Marl, Dolomite, Limestone, Chalk, Halite, Anhydrite, Tuff, Coal, and Basement, and relative percentages of each class. The system includes the processing circuitry is further configured to take the predicted lithofacies classes and respective relative percentages and determine either to initiate a drilling process or to abandon it to save on resources, and the output device is further configured to output the determined initiate a drilling process or to abandon as the exploration decision. The system includes comprising camera-equipped drones and drilling machine cameras configured to capture the digital photos. The system includes a hyperspectral remote sensing device configured to obtain hyperspectral images as the remote sensing maps. The system includes a synthetic-aperture radar to create two-dimensional images as the remote sensing maps. The system includes a seismometer for obtaining the seismic data.

In another exemplary embodiment a method of deciding to drill based on multimodal lithofacies identification includes collecting, by an image data collection interface, data from various sources, including digital photos, remote sensing maps, and scanning electron microscope (SEM) images. The method of deciding to drill based on multimodal lithofacies identification includes extracting, by a first CNN model, features from the digital photos. The method of deciding to drill based on multimodal lithofacies identification includes extracting, by a second CNN model, features from the remote sensing maps. The method of deciding to drill based on multimodal lithofacies identification includes extracting, by a third CNN, features from the SEM images. The method of deciding to drill based on multimodal lithofacies identification includes combining, by an output feature layer, the extracted features from each of the first, second and third CNN models to output combined imaging features. The method of deciding to drill based on multimodal lithofacies identification includes extracting, by a 1-D CNN model, further features using the combined imaging features, wherein the 1-D CNN performs only 1D convolutions. The method of deciding to drill based on multimodal lithofacies identification includes predicting, by a Neural Network (NN) classifier, lithofacies classes along with respective composition percentages and outputting, by an output device, an exploration decision based on the predicted lithofacies classes.

The method includes collecting, by a waveform signal data collection interface, seismic data and well log data from a potential drilling site, deriving statistical feature module and extracting existing features from the seismic data and the well log data through application of power transform, feature interaction, and wavelets transformation, merging the statistical feature module and the extracted existing features with the combined imaging features to obtain merged features and extracting, by the 1-D CNN model, further features using the merged features. The method of deciding to drill based on multimodal lithofacies identification includes selecting, using rule-based selection by processing circuitry, influential features from the statistical feature module and the extracted existing features, merging the influential features with the combined imaging features to obtain merged influential features and extracting further features using the merged influential features. The method includes reducing the features through flattening and densing layers, and a softmax function. The method includes outputting, by the NN classifier, 12 (twelve) pre-defined classes, including Sandstone, Sandstone/Shale, Shale, Marl, Dolomite, Limestone, Chalk, Halite, Anhydrite, Tuff, Coal, and Basement, and relative percentages of each class. The method includes determining, based on the predicted lithofacies classes and respective percentages, either to initiate a drilling process or to abandon it to save on resources and outputting, by the output device, the determined initiate a drilling process or to abandon as the exploration decision. The method includes capturing the digital photos using camera-equipped drones and drilling machine cameras. The method includes obtaining, by a hyperspectral remote sensing device, hyperspectral images as the remote sensing maps. The method includes comprising creating, by a synthetic-aperture radar, two-dimensional images as the remote sensing maps. The method includes comprising obtaining, by a seismometer, the seismic data.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
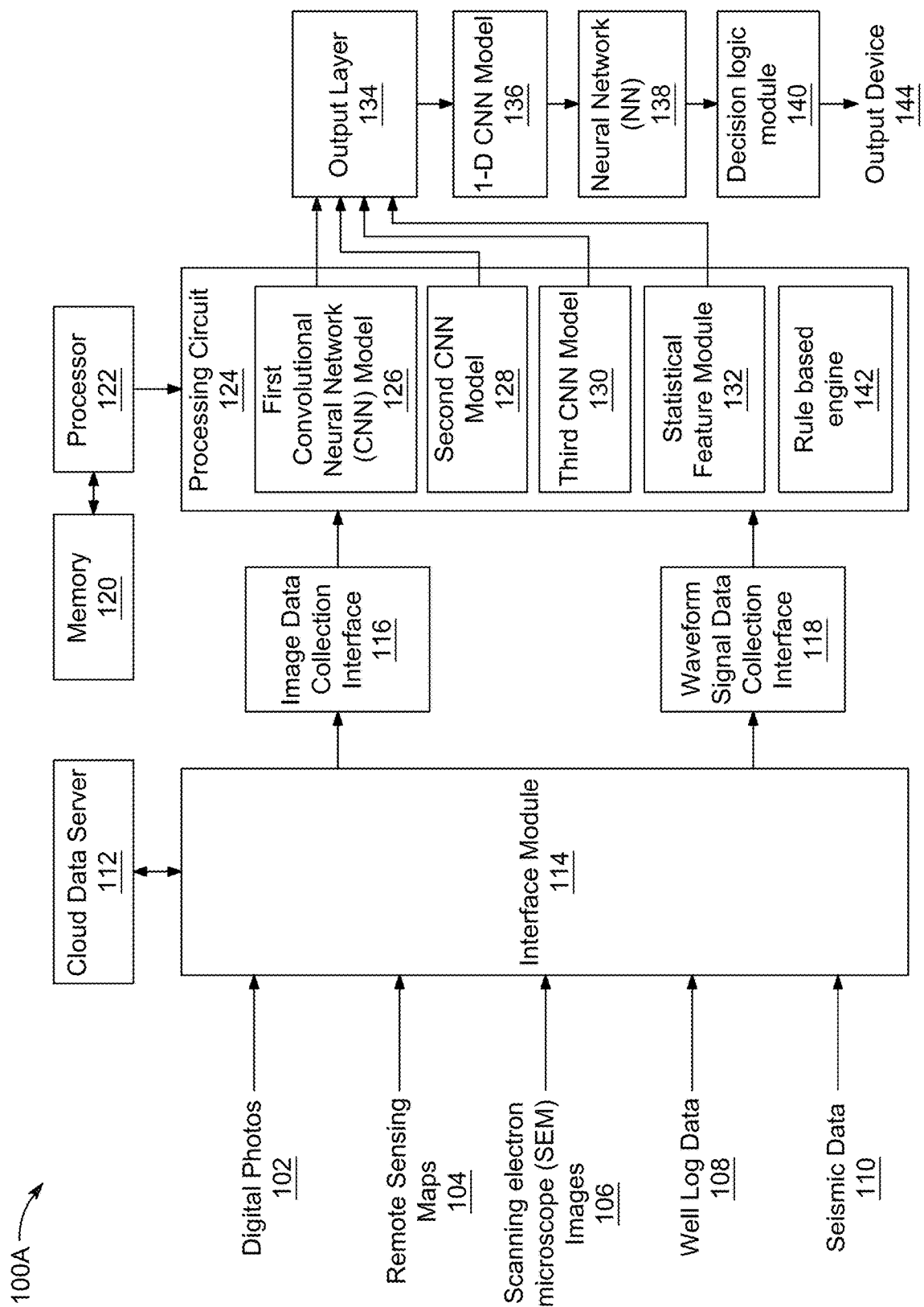
FIG. 1A is a diagram of a drilling decision system based on multimodal lithofacies identification with an exemplary aspect of the disclosure.

In the drawings, like reference numerals designate identical or corresponding parts throughout the several views. Further, as used herein, the words "a," "an" and the like generally carry a meaning of "one or more," unless stated otherwise.

According to the present disclosure, an automated evaluation and identification framework, which is based on a flow among deep learning models, is being used. The disclosure predicts various types of lithofacies along with the percentage of each type and exploration decisions through the analysis of various types of features extracted from disparate lithofacies data sources.

The disclosure is employed in exploring and producing natural resources and to support the understanding of geologic facts in a defined region. The understanding of the geologic facts includes identifying oil and gas reservoirs and areas, creating petroleum systems, creating a geologic and economic overview of certain areas, and preparing for drilling. The disclosure is useful for organizations such as oil and gas-related companies, mineral companies, and organizations interested in mineral resource surveying, as the disclosure supports efforts in exploring geological features for identification of possible areas and reservoirs where such natural resources can most likely be found, along with assessing their quality levels. In another area of application, the disclosure is useful for a geology-related sector as the disclosure aids in gaining a better understanding of the geology of a specific region.

FIG. 1A shows a drilling decision system based on multimodal lithofacies identification. The drilling decision system 100A is used to determine different types of lithofacies, as indications of composition percentage in geology, and generate exploration decisions based on deep learning. The drilling decision system 100A includes a data interface module 114, a cloud data server 112, an image data collection interface 116, a waveform data collection interface 118, a memory unit 120, a processor 122, a processing circuit 124, an output (feature) layer 134, a one-dimension convolutional neural network (1-D CNN) model 136, neural network (NN) classifier 138 and output device 144.

In the present disclosure, the data interface module 114 is configured to receive input data from different sources. The input data includes a digital photo(s) 102, a remote sensing map 104, a scanning electron microscope (SEM) image(s) 106, well log data 108, and seismic data 110. In an aspect, the data interface module 114 can store the received data in the cloud data server 112, or alternatively a local storage device. In the present disclosure, the digital photos 102 are obtained through camera-equipped drones, drilling machine cameras, and digital images obtained in prior drilling activities. The digital photos 102 may be images of layers of sediment and/or rocks. The term "remote sensing map" refers to a two-dimensional or multi-spectral image representation of a geographic area obtained through remote sensing technologies. The remote sensing map 104 can be generated using optical, hyperspectral, multispectral, or radar-based imaging systems, such as those mounted on satellites, drones, or aircraft.

As used herein, the remote sensing map 104 includes spatial and spectral data capable of indicating surface mineralogy, vegetation cover, rock outcrops, and other lithological structures relevant to geological analysis. In some embodiments, the remote sensing map 104 can be derived from hyperspectral imaging sensors such as a hyperspectral remote sensing device that captures data in, for example, dozens to hundreds of narrow, contiguous wavelength bands, or from synthetic-aperture radar (SAR) systems that provide structural insights through backscatter intensity and polarization. The hyperspectral remote sensing device includes a synthetic-aperture radar to create said two-dimensional images.

As used herein, the term "SEM image" refers to a high-resolution, grayscale digital image generated by a scanning electron microscope instrument. The SEM image(s) 106 visualizes the surface morphology and microstructure of rock or sediment samples at magnifications typically ranging from hundreds to tens of thousands of times. The SEM image(s) 106 may reveal pore structure, grain shape, mineral composition, cementation characteristics, and microfracture networks, all of which are relevant for lithofacies classification and reservoir quality estimation. In some embodiments, energy-dispersive X-ray spectroscopy (EDS) data can be co-registered with the SEM image(s) 106 to enable mineralogical interpretation.

As used herein, the term "well log data" refers to a set of one-dimensional depth-indexed measurements obtained from within a drilled borehole using downhole logging tools. The well log data 108 may include but is not limited to gamma ray logs, resistivity logs, neutron porosity logs, density logs, sonic (acoustic) logs, and spontaneous potential logs. These logs capture petrophysical properties of the surrounding formations as a function of depth and are essential in identifying lithological boundaries, fluid content, porosity, and shale volume. The well log data 108 may be acquired in real-time during drilling (logging-while-drilling) or post-drilling (wireline logging). In some examples, the well log data can be stored in digital LAS (Log ASCII Standard) format or any other format that can be useful in further processing.

As used herein, the term "seismic data" refers to subsurface acoustic reflection data acquired through the generation and detection of seismic waves. The seismic data 110 is collected using active sources (e.g., vibroseis trucks, dynamite, seismometers) and geophone or hydrophone arrays to detect wave reflections and refractions from subsurface geological layers. The seismic data 110 can include two-dimensional (2D) seismic lines, three-dimensional (3D) seismic volumes, or pre-stack gathers. After standard processing (e.g., deconvolution, migration, stacking), the seismic data 110 reveals stratigraphic, lithologic, and structural information useful for hydrocarbon exploration and lithofacies interpretation. Attributes such as reflection amplitude, frequency content, and continuity can be extracted and used as input features in the present system 100A.

The data interface module 114 is communicatively coupled to the cloud data server 112 to store, pre-process, and manage the input data. The data interface module 114 is configured to receive, preprocess, and transmit the respective input data to subsequent processing modules. In some aspects, the data interface module 114 transmits image-based data, such as the digital photos 102, the remote sensing maps 104, and the SEM images 106, to the image data collection interface 116. The image data collection interface 116 is configured to normalize and format the images for subsequent processing by convolutional neural networks (CNNs).

Similarly, waveform-based data or seismic data, such as well log data 108 and seismic data 110, is provided to the waveform signal data collection interface 118 by the data interface module 114. The waveform signal data collection interface 118 performs preprocessing operations such as sampling, noise filtering, and interpolation, preparing the data for feature extraction and statistical analysis.

The image data collection interface 116 and the waveform signal data collection interface 118 are communicatively coupled to the processing circuit 124, which is configured with one or more computational models and feature extraction modules. The processing circuit 124 may be implemented as a software-defined module operating on one or more processors 122 in communication with the memory unit 120.

The processing circuit 124 is configured with a first convolutional neural network (CNN) model 126 to extract features from the digital photos 102. In one implementation, the first CNN model 126 can include, for example, a ResNet-50 or InceptionV3 architecture trained to detect sedimentary features such as grain size, color variance, stratification patterns, and other sedimentary structure features. In an exemplary implementation, the first CNN model 126 is configured to process digital photos 102 of exposed geological surfaces, core samples, or outcrop images, typically captured by field personnel, drone systems, or site surveillance cameras. These digital photos are often rich in visible-texture information, including stratification, grain size contrast, fracture lines, color variation, and erosional features. The first CNN model 126 receives the pre-processed digital images via the image data collection interface 116 and applies a deep convolutional architecture. In one exemplary embodiment, the CNN architecture includes multiple convolutional layers followed by activation functions (e.g., ReLU), batch normalization, pooling layers (e.g., max pooling), and fully connected layers. Each convolutional layer applies a set of trained filters to detect low-level and high-level spatial features. For instance, initial layers extract edge patterns and textures, while deeper layers identify higher-level constructs such as sedimentary layering, cross-bedding, or lithologic boundaries. The output of the first CNN model 126 comprises a set of multi-dimensional feature maps that represent the extracted visual characteristics of the photographed geological formations. These features are passed forward to an output layer 134 for fusion with features derived from other modalities.

The processing circuit 124 is configured with a second CNN model 128, to receive and process remote sensing maps 104. The second CNN model 128 is trained using hyperspectral satellite data to distinguish lithological classes based on spectral reflectance properties. The second CNN model 128 is configured to process remote sensing map data 104, including but not limited to hyperspectral imagery, multispectral satellite images, and synthetic-aperture radar (SAR) data. These images cover larger geographic areas and capture spectral or radar backscatter information that correlates with mineral content, vegetation type, surface roughness, and geomorphology. The second CNN model 128 receives the remote sensing maps via the image data collection interface 116 and applies a CNN architecture specifically tuned for spectral-spatial feature analysis. For hyperspectral images, the model employs three-dimensional (3D) CNN filters or applies spectral attention mechanisms to extract both spatial structures and spectral signatures. For SAR images, the CNN can learn backscatter texture patterns corresponding to different rock or sediment classes. The second CNN model 128 thus generates feature maps encoding regional-scale lithological and geomorphological indicators. The features can be complementary to those extracted by the first CNN model 126 and are forwarded to the output layer 134 for integration.

The processing circuit 124 is configured with a third CNN model 130 to extract microstructural features from SEM images 106. The third CNN model 130 can analyze grain morphology, porosity, and cementation characteristics, which are indicative of lithofacies such as sandstone, dolomite, or shale. The third CNN model 130 is configured to analyze scanning electron microscope (SEM) images 106, which capture the microstructural characteristics of geological samples. The SEM image(s) 106 reveal sub-millimeter-scale features such as pore connectivity, mineral grain boundaries, voids, and textural roughness, which are often indicative of rock types such as shale, sandstone, dolomite, or limestone.

Upon receipt of the SEM image data, the third CNN model 130 executes a high-resolution CNN pipeline that may involve dilated convolutions, multi-scale feature extraction modules, and skip connections to retain fine detail throughout the processing pipeline. In one embodiment, the CNN model is pre-trained on microscopy image datasets and fine-tuned using domain-specific lithofacies-labeled SEM images. The extracted microstructural features from the third CNN model 130 are encoded in high-dimensional feature vectors or maps, which are transferred to the output layer 134 for multimodal fusion with the outputs from the first and second CNN models.

The processing circuit 124 is further configured with a statistical feature module 132 that extracts existing features from the seismic data and the well log data through application of, for example, power transform, feature interaction, and wavelets transformation.

The system further includes a rule-based engine 142, implemented using part of the processing circuit 124. The processing circuit 124 is configured to perform learned feature selection from statistical and waveform-derived features prior to their integration with imaging features. The rule-based engine 142 serves as a strategic intermediary that enhances the interpretability, dimensional efficiency, and relevance of multimodal input data prior to convolutional refinement. In examples, the rule-based engine 142 operates on statistical feature data derived from, for example, seismic data 110 and well log data 108. These features may be obtained using preprocessing techniques such as power transformation, interaction terms computation, and wavelet transformations. The rule-based engine 142 evaluates the statistical merit and geological significance of each feature and filters the set to retain only influential features, that is, features which are correlated with lithofacies variation or critical for predictive accuracy.

In examples, the rule-based engine 142 applies one or more predefined or dynamically adaptable rules drawn from statistical thresholds, geophysical models, and empirical domain knowledge. The rules include, without limitation:
1. Statistical Threshold Rules: Features are selected if they exceed predetermined thresholds for statistical properties such as variance, skewness, or kurtosis. For example, seismic amplitude attributes are retained only if their variance surpasses a threshold indicating significant heterogeneity in subsurface reflections.
2. Correlation and Redundancy Elimination: Features with high inter-feature correlation (multicollinearity) are removed to prevent redundancy. For example, among density and bulk density logs, only one is retained if they exhibit a Pearson correlation coefficient above 0.95.
3. Information Gain Rules: Features contributing significant reduction in uncertainty (entropy) during training are retained based on information gain metrics. For example, features providing high discriminative power between shale and sandstone classes are prioritized.
4. Domain-Specific Heuristic Rules: Rules based on geological knowledge or historical field data. For example, gamma-ray logs are prioritized for clay-rich formations, resistivity logs are emphasized for carbonate formations.
5. Context-Aware Adaptive Rules: Dynamic adjustment of selection logic based on site-specific patterns, classifier feedback, or real-time operational parameters.

The rule-based engine 142 outputs a filtered set of influential features, which are merged with the combined imaging features extracted by the first CNN model 126, second CNN model 128, and third CNN model 130. The result is a merged influential feature set comprising both visual and signal-derived attributes that have passed through domain-informed filtration. The merged influential feature set is provided as input to the 1-D CNN model 136, which performs feature convolution, refinement, and pattern recognition. The selection carried out by the rule-based engine 142 improves classification performance by reducing irrelevant input noise, limiting overfitting, and optimizing computational efficiency. In some embodiments, the rule-based engine 142 further provides explainable outputs indicating why specific features were selected or excluded, enhancing transparency for decision support in geological exploration.

The output layer 134 performs a fusion operation, such as feature concatenation, attention-weighted averaging, or canonical correlation analysis, on the outputs of the first, second, and third CNN models. The results in a unified feature representation that encodes macro-, meso-, and micro-scale lithological indicators derived from photographs, remote imagery, and SEM data, respectively. The fused feature vector is utilized for downstream operations, including processing by the 1-D CNN model 136, integration with waveform-derived statistical features, and ultimately lithofacies classification by the NN classifier 138, which are explained below.

Following the multimodal feature fusion performed by the output layer 134, the resulting combined imaging features are provided as input to a one-dimensional convolutional neural network (1-D CNN) model 136. The 1-D CNN model 136 is configured to perform sequential pattern learning, dimensionality reduction, and discriminative feature enhancement on the fused feature vector.

Unlike conventional CNNs that operate on two- or three-dimensional image matrices, the 1-D CNN model 136 exclusively applies one-dimensional convolutional filters along the feature axis. This enables the model to capture sequential dependencies, co-occurrence patterns, and feature interactions across modalities without spatial context assumptions.

In an exemplary embodiment, the 1-D CNN model 136 comprises multiple stacked 1D convolutional layers, each layer being configured as a 1D array for both kernels and feature maps. Each 1D convolutional layer is followed by a non-linear activation function (e.g., ReLU), dropout layers to prevent overfitting, and optional max-pooling layers to reduce dimensionality. The final convolutional layers is followed by a flattening operation, a dense (fully connected) layer, and a softmax or sigmoid activation layer to generate a final refined feature vector. The feature vector is more compact and optimized for classification purposes. When waveform-derived features (e.g., from seismic data 110 and well log data 108) are included, the merged features are also be input to the 1-D CNN model 136. In such configurations, the 1-D CNN model 136 operates on both imaging and waveform-derived features in a unified feature space, facilitating cross-domain pattern recognition and correlation.

The refined feature vector output by the 1-D CNN model 136 is passed to the NN classifier 138. The NN classifier 138 is configured to assign lithofacies labels and predict composition percentages corresponding to the identified classes.

In one embodiment, the NN classifier 138 is implemented as a multi-layer perceptron (MLP) with one or more hidden layers and a softmax output layer. The classifier is trained using a supervised learning technique on a labeled dataset including ground-truthed lithofacies categories and corresponding geochemical or petrological composition data. In examples, the classifier outputs two types of information:
1. Lithofacies Class Prediction: A categorical prediction indicating one or more of a predefined set of lithofacies classes. In one non-limiting embodiment, these classes include Sandstone, Sandstone/Shale, Shale, Marl, Dolomite, Limestone, Chalk, Halite, Anhydrite, Tuff, Coal, and Basement. Each class is assigned a confidence score or probability.
2. Composition Percentages: A numerical prediction indicating the estimated percentage composition of each identified lithofacies class. These percentages are useful for assessing the relative abundance and significance of each class within the target zone.

The classifier is configured to output a single dominant class or a probability distribution across multiple lithofacies, based on the operational setting and training strategy.

The final stage of the system involves a decision logic module 140 that evaluates the outputs of the NN classifier 138 to determine whether to initiate, delay, or abandon a drilling operation.

The decision logic module 140 is configured to:
Interpret the predicted lithofacies classes and their respective relative percentages.
Apply domain-specific rules, heuristics, or thresholds (e.g., minimum required percentage of hydrocarbon-bearing lithofacies).
Evaluate commercial viability, risk indicators (e.g., presence of basement rock or high shale content), and operational feasibility.

For instance, if the output composition includes greater than 60% sandstone or dolomite with favorable porosity indications from well log data 108, the logic may determine that drilling should be initiated. Conversely, if the dominant class is shale or coal with poor reservoir characteristics, the decision logic can recommend abandoning the operation to conserve resources. The outcome of the analysis is communicated via an output device 144, which can include a graphical user interface, alert system, or integration with a broader exploration management platform. The output can include a binary recommendation (drill/abandon), detailed in accordance with various embodiments, the input data is of critical importance in facilitating the process of lithofacies identification and evaluation.

Figure 1B:
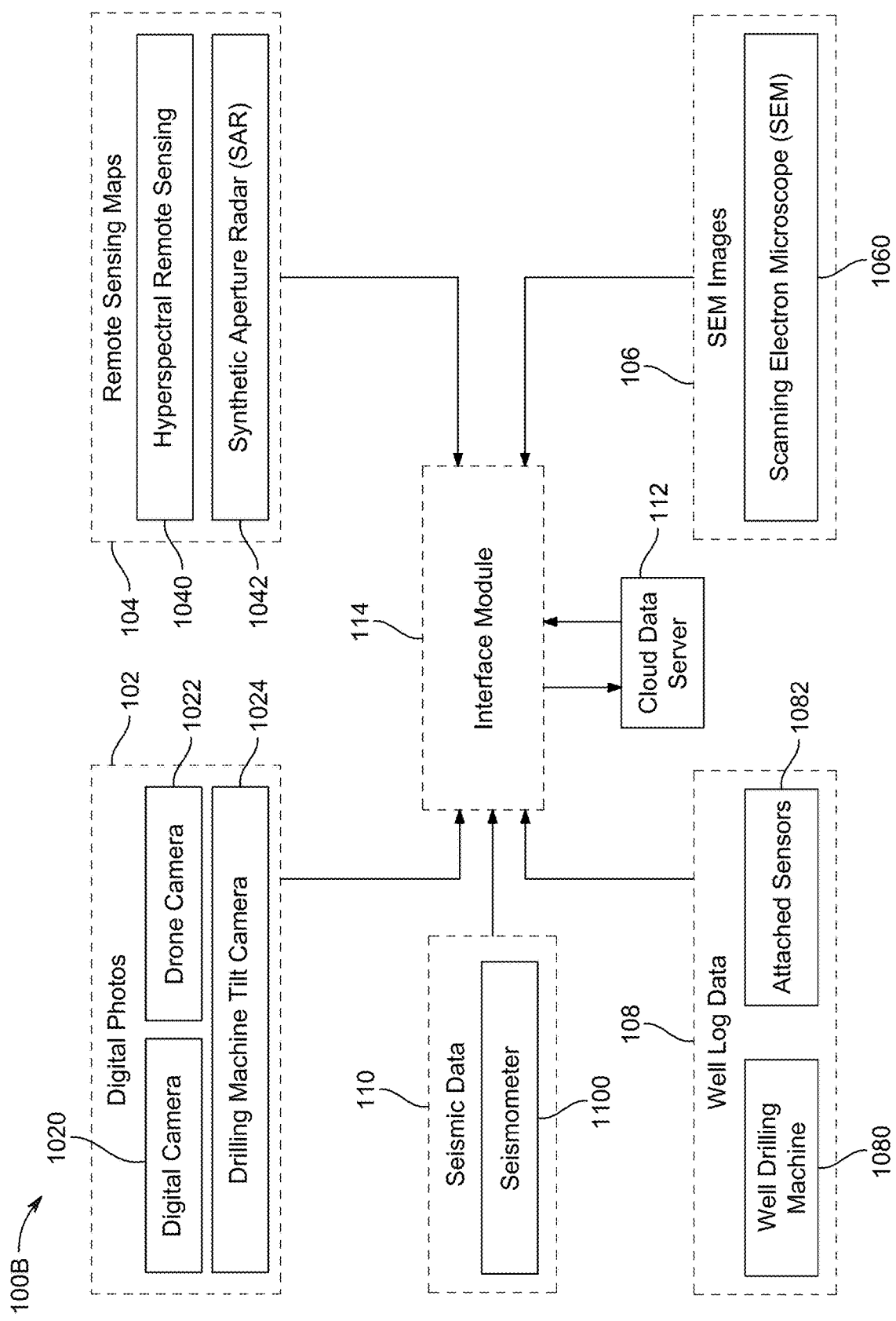
FIG. 1B is a diagram of data collection for lithofacies from different sources, with an exemplary aspect of the disclosure.

Referring now to FIG. 1B, an exemplary embodiment of a data acquisition system 100B for a drilling decision system based on multimodal lithofacies identification, is illustrated. The data acquisition system 100B includes various sources of input data providing the input data to the data interface module 114. The system 100B is configured to collect, aggregate, and transmit geological, geophysical, and imaging datasets from various acquisition sources to a data interface module 114 for downstream processing and lithofacies classification. For example, the digital photos associated with surface and near-surface geological formations are obtained through, for example, the following instruments:

Digital camera 1020 configured to capture static high-resolution geological photographs.
A drone-mounted camera 1022 configured to obtain aerial imagery of terrain and exposed lithological features.
A drilling machine tilt camera 1024 configured to capture oblique or vertical imagery from within drilling environments.

To acquire remote sensing maps that provide large-scale spectral and radar-based geological mappings, the system 100B further includes
A hyperspectral remote sensing system 1040 capable of acquiring multi-band spectral data over a wide range of electromagnetic frequencies, enabling the discrimination of surface mineralogy, moisture levels, and vegetative patterns correlated with subsurface composition.
A synthetic aperture radar (SAR) system 1042 configured to generate high-resolution radar imagery independent of ambient light and weather conditions, facilitating terrain mapping and structural feature delineation.

The data sources generate remote sensing maps that are processed to extract spatial-spectral features via the CNN analysis.

The SEM images are acquired through a scanning electron microscope 1060 configured to obtain microstructural imagery of rock and sediment samples. The SEM images are used for high-resolution feature extraction of grain boundaries, pore networks, and mineralogical textures, particularly useful in carbonate or shale reservoirs.

The well log data is acquired through a well drilling machine 1080 and a plurality of attached downhole sensors 1082. The sensors are configured to record measurements while drilling (MWD) and logging while drilling (LWD), including parameters such as gamma-ray intensity, resistivity, density, porosity, acoustic velocity, and neutron counts. The well log data 108 provide high-vertical-resolution, depth-indexed petrophysical measurements crucial for stratigraphic and lithological interpretations.

The seismic data is acquired through a seismometer 1100 that captures seismic reflection and refraction signals from below the Earth's surface. The seismometer 1100 is configured for vertical seismic profiling (VSP), crosswell tomography, or surface-based seismic acquisition. The seismic data 110 are processed to generate waveform attributes such as amplitude, frequency, and phase characteristics, which are used in conjunction with log and image-based features for lithofacies classification.

All collected datasets 102, 104, 106, 108, and 110 are received at a central interface which is the data interface module 114. The data interface module 114 acts as a data aggregation and synchronization unit that performs preprocessing, validation, and formatting for downstream neural network processing. The interface module 114 may also be configured to communicate with the cloud data server 112, which provides long-term storage, remote accessibility, and computational offloading capabilities. Data may be transmitted from the field to the cloud server using secure wireless or wired communication protocols.

Figure 2:
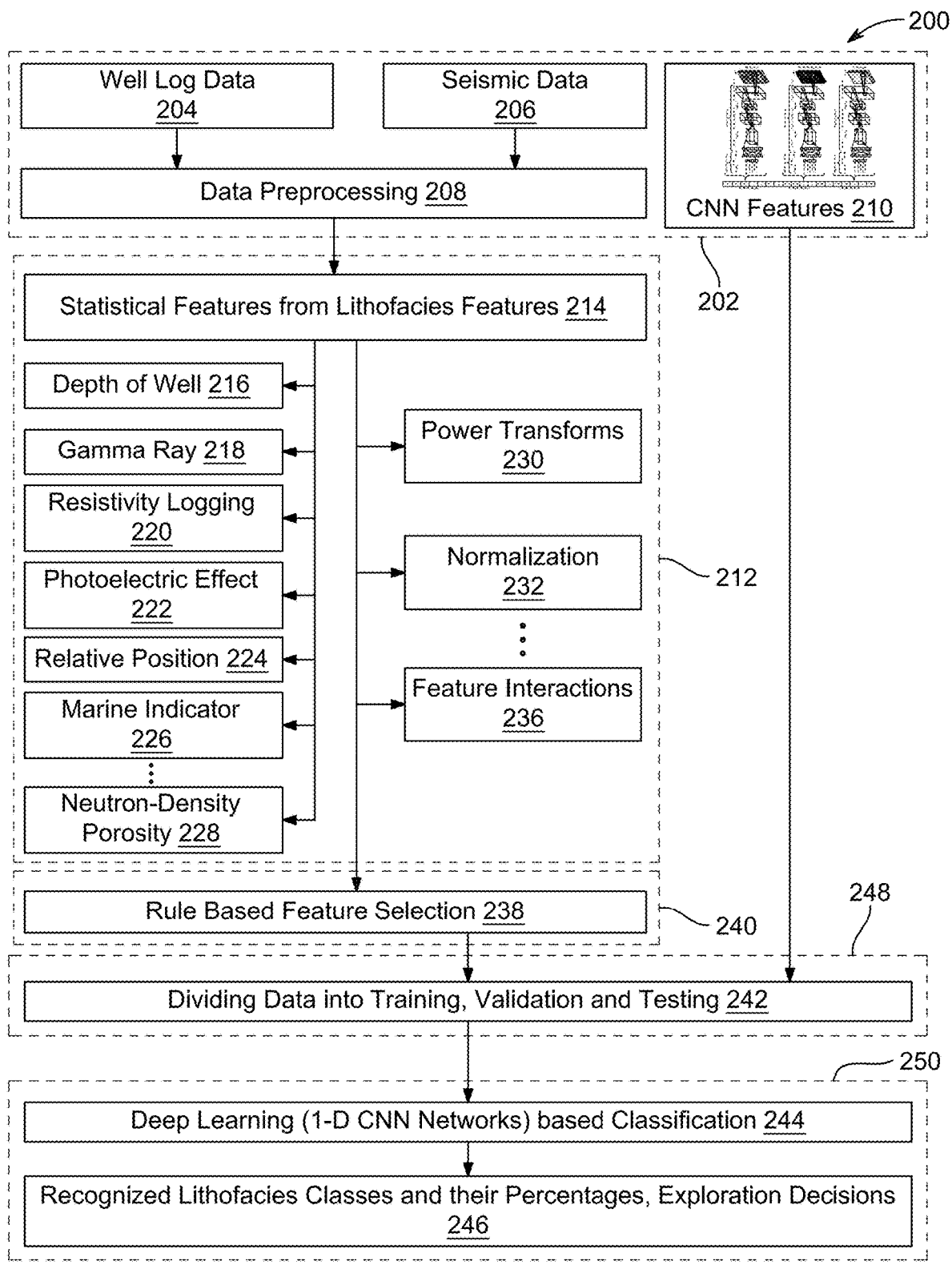
FIG. 2 is an illustration of workflow diagram of the proposed lithofacies methodology, according to certain embodiments.

Referring now to FIG. 2, there is illustrated an exemplary embodiment of a lithofacies feature processing and classification system 200 configured for the recognition of lithofacies classes using multimodal geoscientific data. The system 200 receives various input datasets, processes the datasets through multiple transformation and feature selection stages and classifies lithofacies using a deep learning architecture. FIG. 2 shows a multistage processing pipeline, wherein each stage performs a specific transformation or learning task as follows:
   Stage 202: Raw data preprocessing
   Stage 212: Statistical feature extraction
   Stage 240: Feature selection
   Stage 248: Dataset analysis and partitioning
   Stage 250: Lithofacies type identification and evaluation The stage 202 includes data acquisition and preprocessing, where the system 200 include the data interface module 114 that receives geophysical and geological datasets including well log data 204 (similar to the well log 108 of FIG. 1A) and seismic data 206 (similar to seismic data 110 of FIG. 1A). The well log data 204 includes measurements acquired from sensors located on a well drilling machine and consists of petrophysical parameters such as gamma ray, resistivity, neutron porosity, density, and photoelectric index. The seismic data 206 includes waveform-based information such as amplitude, phase, frequency, and derived attributes recorded via geophones or seismometers.

Additionally, the system 200 incorporates CNN-derived imaging features 210 obtained from the processed digital photos 102, the remote sensing maps 104, and the SEM images 106, as explained with reference to FIGS. 1A and 1B. The CNN features 210 are extracted using one or more trained convolutional neural networks (through corresponding the first CNN model 126, the second CNN model 128 and the third CNN model 130 of the processing circuit 124), which are configured to identify lithological patterns, textures, and anomalies within the image datasets.

The stage 212 performs feature extraction and transformation where the preprocessed datasets are subjected to a statistical feature extraction (using the statistical feature module 132 of the processing circuit 124), which computes domain-specific features relevant to lithofacies identification. These features include, but are not limited to:
   Depth of Well 216: a scalar feature representing the depth from the surface at which the measurement is recorded.
   Gamma Ray 218: a log-derived indicator of natural radioactivity, useful for shale volume estimation.
   Resistivity Logging 220: a measure of the formation's ability to resist electrical current, indicative of hydrocarbon saturation.
   Photoelectric Effect 222: a value representing the photoelectric absorption index, helpful in lithology differentiation.
   Relative Position 224: a positional metric within a stratigraphic layer or geological unit.
   Marine Indicator 226: a binary or probabilistic feature representing whether the sample originates from a marine depositional environment.
   Neutron-Density Porosity 228: a derived porosity feature based on the crossover between neutron and density logs.

The extracted features are processed through the statistical feature module 132 that includes functions comprising, but not limited to:
   Power Transforms 230: used to stabilize variance and normalize skewed distributions of numerical features.
   Normalization 232: applied to scale input features within a fixed numerical range, typically zero to one, to facilitate convergence during neural network training.
   Wavelet transformations (not shown): applied to the seismic and well log data to decompose signals into time-frequency components, enabling effective characterization of high and low-frequency lithofacies features.
   Feature Interactions 236: computed through statistical and domain-specific combinatorial techniques, enabling the model to capture second-order relationships between primary features.

Stage 240 includes rule-based feature selection (shown as block 238) where the transformed features are further filtered using a rule-based engine 142. The rule-based engine 142 is configured to select a subset of features based on deterministic rules derived from expert geological knowledge, data quality metrics, and signal-to-noise ratio thresholds. Such rule-based pruning enhances model performance by discarding redundant, irrelevant, or low-informational-value features. The output is a reduced set of influential statistical features.

The influential statistical features from rule-based engine 142 are merged with the combined imaging features produced by the output feature layer 134, which concatenates the outputs of the CNN models (126, 128, 130). This merged feature set is partitioned by a dataset partitioning submodule (also in the processing circuit 124) into distinct training, validation and testing subsets 242, ensuring representative sampling for model development and evaluation. The partitioning is performed so that the model is trained on representative samples, validated for generalization capability, and tested on previously unseen data.

In stage 250 of lithofacies type identification and evaluation, there are deep learning-based classification 244 and the output block 246. In the deep learning-based classification 244, the partitioned datasets are input into a deep learning classification comprising one or more one-dimensional convolutional neural networks (1D CNNs) (the one-dimensional CNN model 136). The 1D CNNs are configured to process sequential or depth-wise feature vectors, extract spatial-temporal patterns, and learn hierarchical representations for lithofacies classification. The output of the 1-D CNN model 136 is then passed to the NN classifier 138, implemented as a multi-layer perceptron with a softmax output. The classifier 138 predicts one or more of twelve lithofacies classes (e.g., Sandstone, Shale, Limestone, among others) along with corresponding composition percentages. Finally, the predicted facies and percentages are communicated to the output device 144, which generates an exploration decision (e.g., drill/abandon, target intervals) based on predefined business rules. The output of the classification 244 includes recognized lithofacies classes and their respective percentages across the depth profile, as well as exploration decisions 246. Such exploration decisions can include, for example, drill/no-drill flags, depth intervals for coring, or regions of hydrocarbon potential.

Figure 3:
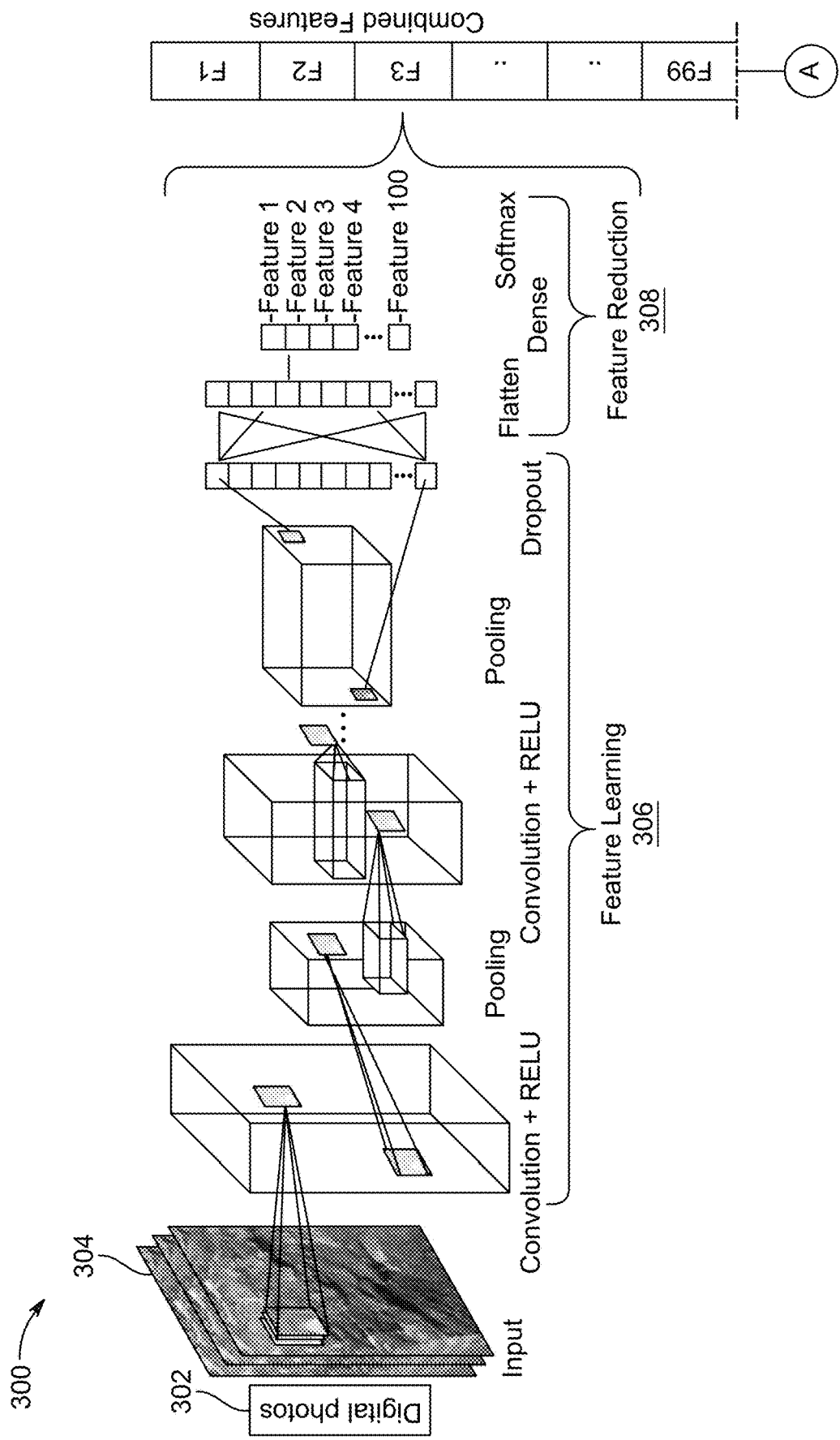
FIG. 3 is an illustration of convolutional neural network (CNN) features extraction from the imagery data, according to certain embodiments.
Figure 3:
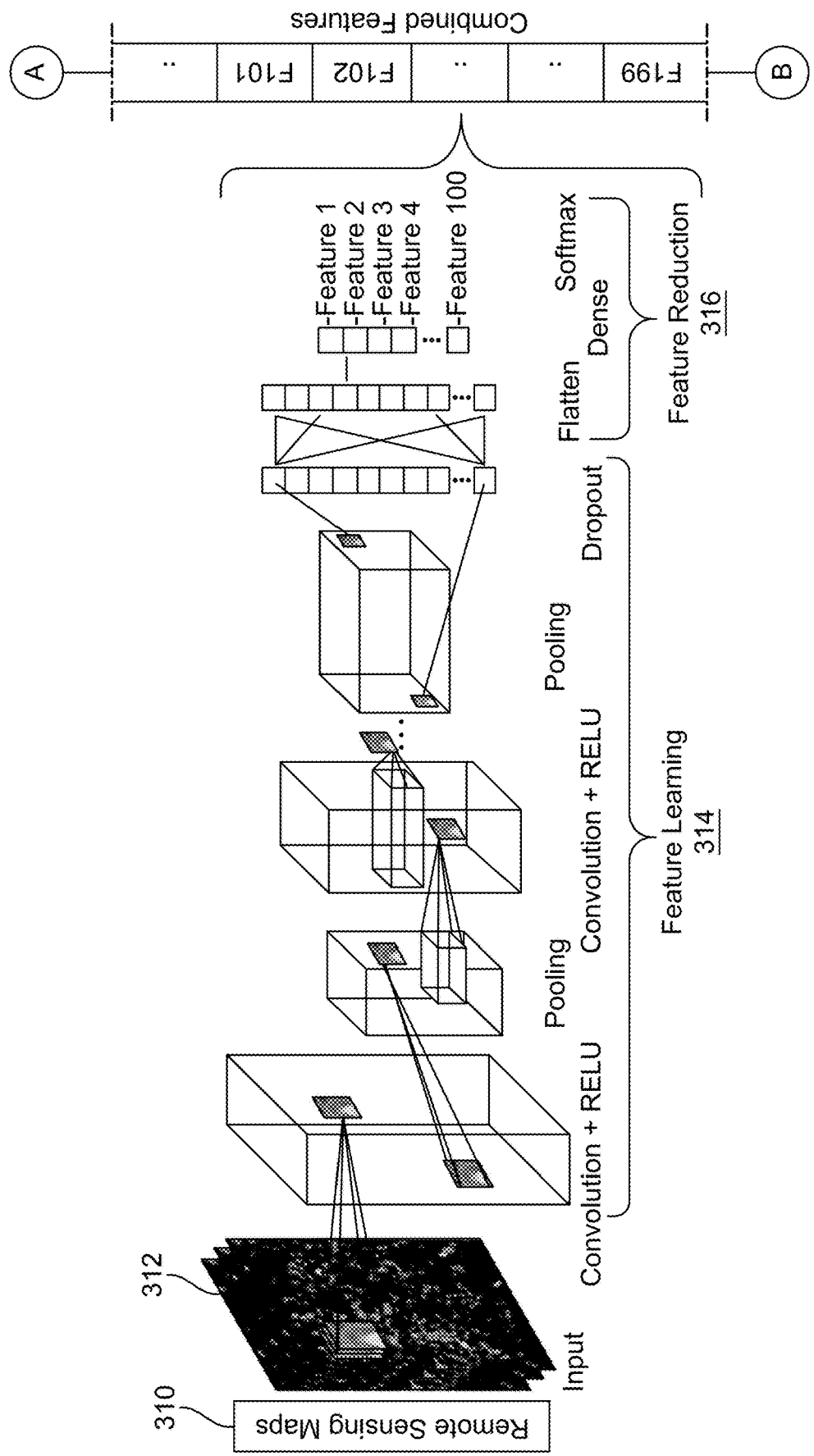
Figure 3:
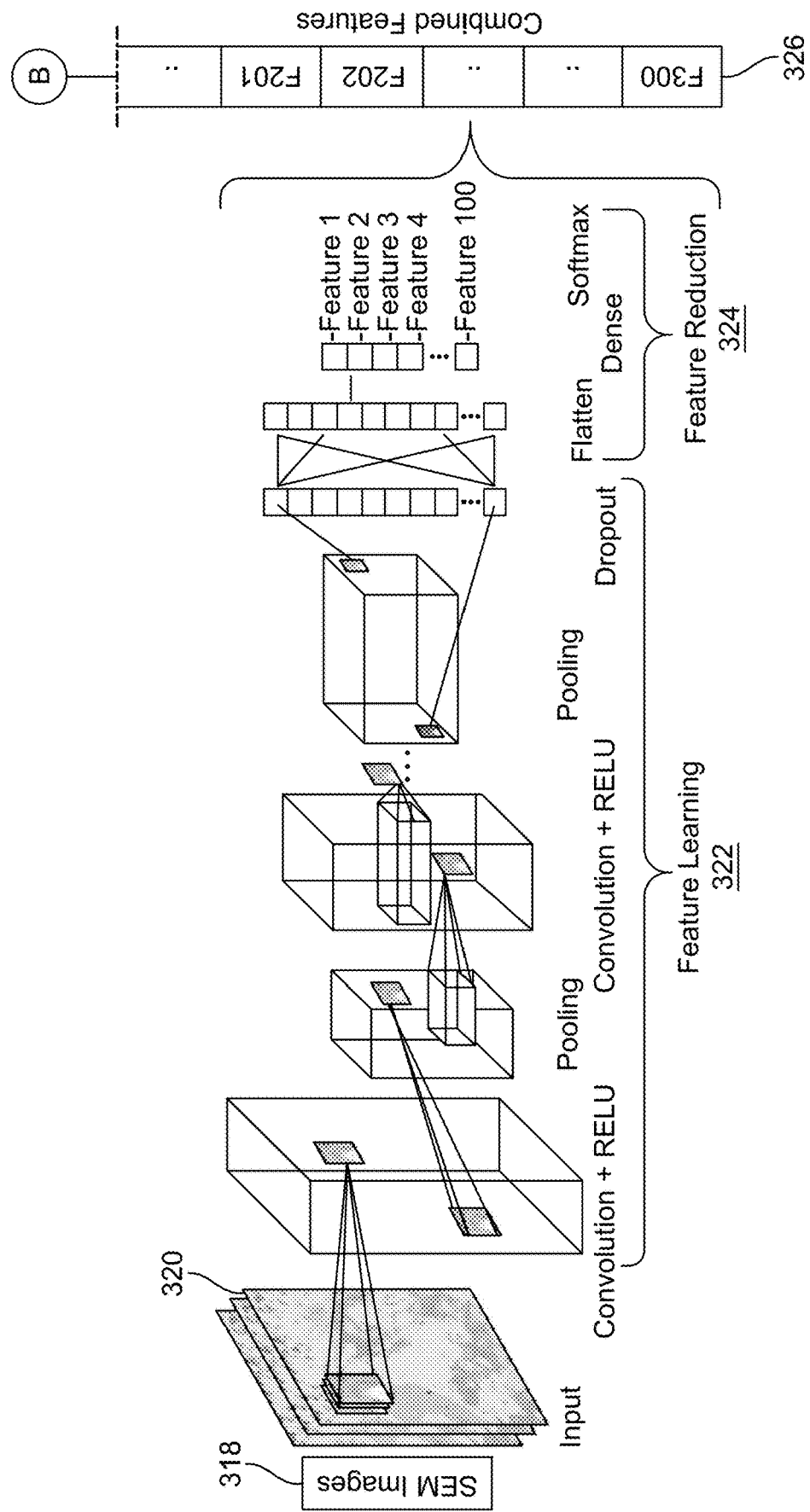

FIG. 3 illustrates a block diagram of a deep learning-based lithofacies classification system 300 employing the CNN architecture (the first CNN model 126, the second CNN model 128, the third CNN model 130 and the 1-D CNN model 136). The system 300 is configured to process various types of lithofacies-related image data to extract discriminative features and generate lithofacies classifications and associated composition percentages. The classification system 300 is configured for ingesting multiple image modalities as inputs, including but not limited to digital photos 310, remote sensing maps 312, SEM images 318, and the like. Each modality represents a specific lithofacies signature and is subjected to a customized yet consistent deep learning pipeline, optimized for high-accuracy classification. Each of the digital photos 310, the remote sensing maps 312, and the SEM images 318 are processed by a corresponding feature extraction and classification subnetwork having main stages that include corresponding feature learning and feature reduction. An exemplary feature learning 322 and feature reduction 324 are explained below for processing the SEM images 318. The feature learning 322 includes the following sequential stages:

Convolution Layer with ReLU Activation: the stage involves receiving input 320 and applying convolutional filters to extract low-level spatial features such as edges, textures, and local patterns. A ReLU activation function is employed to introduce non-linearity, thereby improving model expressiveness.

Pooling Layer: The pooling layer includes a reduction in the spatial dimensionality of feature maps while retaining the most salient information.

Additional Convolution with ReLU and Pooling Layers: These stages include intermediate convolutional and pooling layers to allow deeper hierarchical representation learning, capturing higher-level abstractions such as shapes and lithofacies boundaries.

Dropout Layer: the dropout layer introduces regularization by randomly disabling neurons during training to prevent overfitting and enhance model generalization.

The feature reduction 324 includes the following stages:

Flatten Layer: converts multi-dimensional feature maps into a one-dimensional vector, enabling transition from spatial domain to feature domain.

Dense Layer and softmax layer involve applying a fully connected dense layer followed by a softmax activation to produce a probabilistic distribution over the twelve predefined lithofacies classes, as referenced in stage 250 of FIG. 2.

Performs post-processing on the CNN feature vector to reduce redundancy and retain the most discriminative 100 features. The output forms the CNN Feature Vector 326 which includes a combined feature list. The CNN feature vector 326 is combined with engineered statistical features from FIG. 2 to enhance classification accuracy and interpretability. The final output from each CNN branch is a 12-class lithofacies prediction, represented graphically as a composition bar. Each segment of the bar corresponds to a specific lithofacies type, with relative width indicating the predicted proportion of that class in the input data. The system 300 supports simultaneous classification across multiple modalities (e.g., images from digital photos, remote sensing, SEM), enabling multimodal learning and decision fusion. In some embodiments, a fusion layer may be optionally employed downstream of each CNN branch to aggregate features across modalities before classification.

Figure 4:
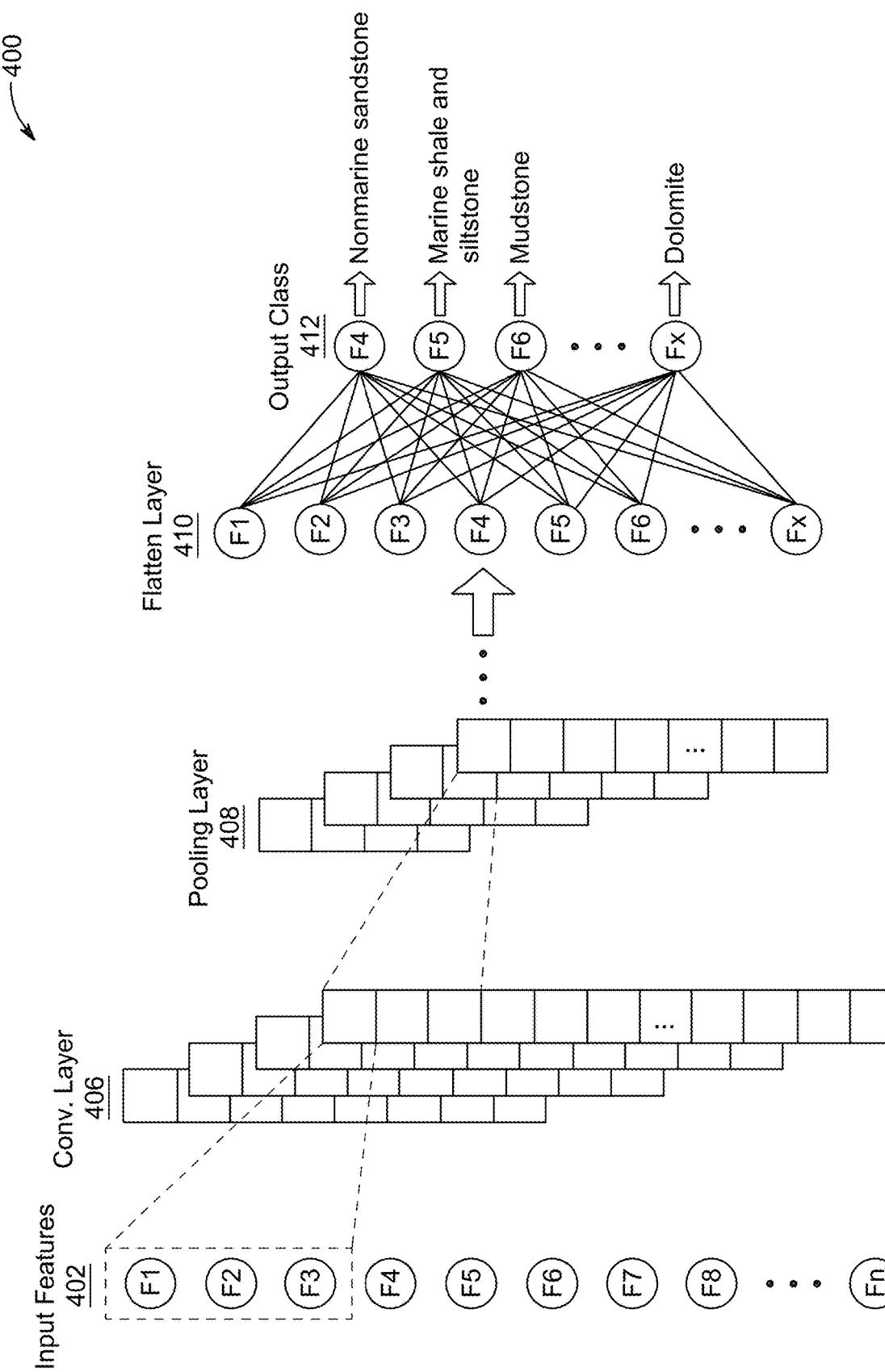
FIG. 4 is an illustration of schematic structure of the one-dimension CNN (1-D CNN) model for lithofacies prediction, according to certain embodiments.

FIG. 4 illustrates an exemplary schematic diagram 400 of a one-dimensional convolutional neural network (1D-CNN) model 136 architecture configured for lithofacies identification and evaluation, according to one embodiment of the present disclosure.

As shown, FIG. 4 includes an input features layer 402, which receives a combined feature set including: (i) CNN-derived features extracted from various image modalities (such as digital rock images, thin section micrographs, SEM images, and satellite imagery), and (ii) statistical features derived from well log data and seismic attributes. These heterogeneous feature types are merged to construct a unified input feature vector, which serves as the basis for the subsequent neural network processing.

The input feature vector is provided to one or more convolutional layers 406 of the 1D-CNN architecture. These convolutional layers perform a series of feature extraction operations, wherein correlation analyses are conducted using one or more activation functions (e.g., ReLU, tanh). The convolutional layers 406 include multiple successive convolution operations to capture hierarchical spatial patterns and correlations among the input features and may be considered as a feature extractor stage.

The outputs of the convolutional layers 406 are input into corresponding pooling layers 408, which perform dimensionality reduction, noise suppression, and data smoothing operations. The pooling stage is configured to reduce overfitting, retain the most salient or discriminative features, and down-sample the input representation while preserving key structural characteristics relevant to lithofacies classification. The pooling operations may include, but are not limited to, max-pooling or average-pooling mechanisms.

In some embodiments, the convolutional layer 406 and the pooling layer 408 are repeated in multiple sequential blocks to facilitate deep hierarchical learning of spatially correlated geological features. The extracted features from the final pooling layer are passed to a flatten layer 410, where the multidimensional feature maps are converted into a one-dimensional column vector suitable for input to a fully connected neural network classifier.

The flattened feature vector is provided to an output classification layer 412, which is implemented as a fully connected feed-forward neural network. The classification layer receives the extracted and flattened feature inputs and computes predicted lithofacies class labels, including but not limited to nonmarine sandstone, marine shale and siltstone, mudstone, and dolomite. In addition to class predictions, the output layer also provides associated composition percentages for each predicted lithofacies, and exploration decisions based on the learned feature representations and underlying statistical and image-based data.

The described 1D-CNN model 136 falls within the category of feed-forward neural networks and is architected to support end-to-end learning for lithofacies classification using integrated multi-source geoscientific data. As such, the architecture enables robust and scalable lithological interpretation, facilitating improved reservoir characterization and decision-making in subsurface exploration workflows.

Figure 5:
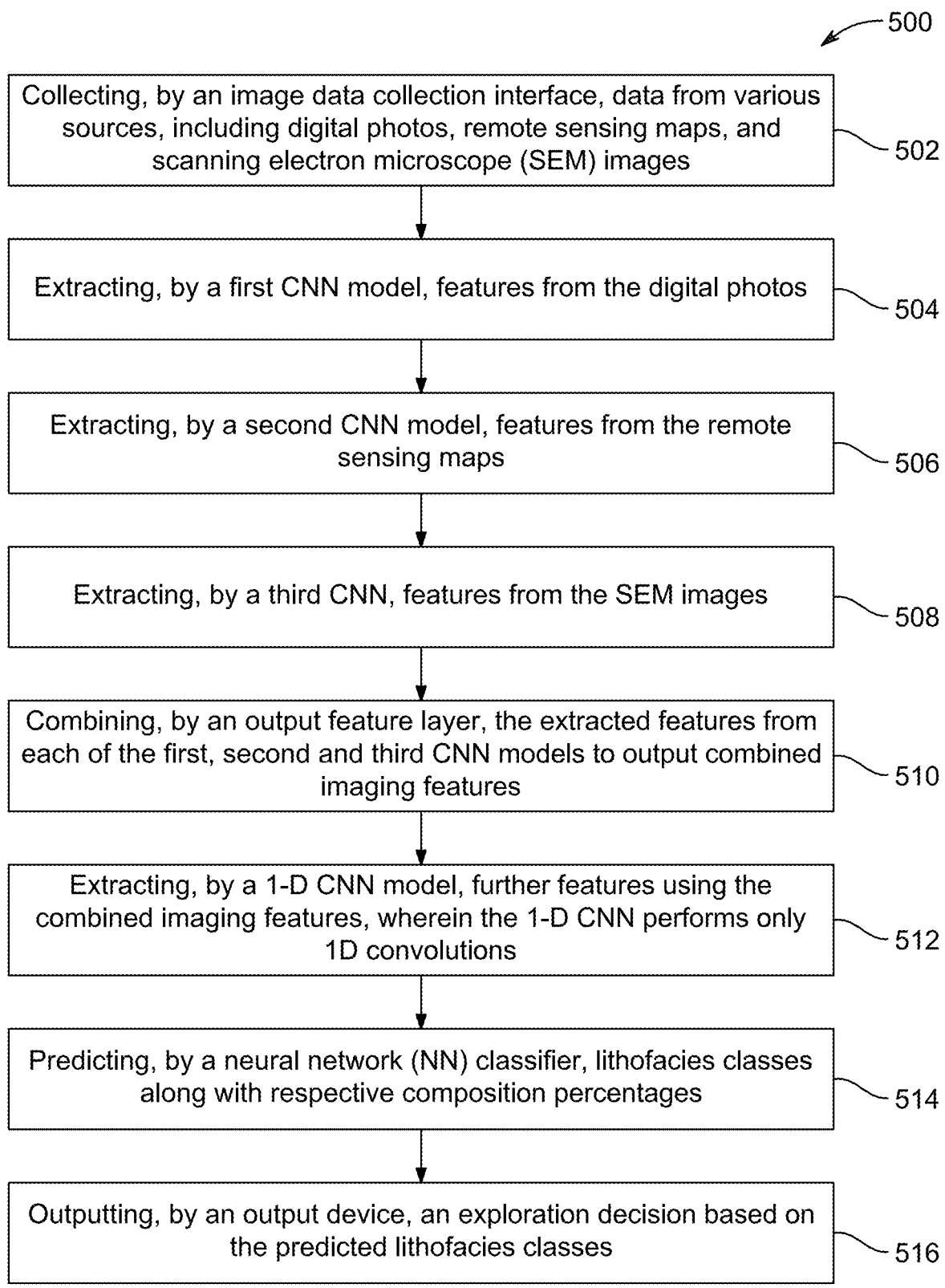
FIG. 5 is process of deciding to drill based on multimodal lithofacies identification, according to certain embodiments.

FIG. 5 illustrates an example process flow 500 for performing lithofacies classification and exploration decision-making based on multimodal imaging data, in accordance with one or more embodiments.

At step 502, an image data collection interface 116 is configured to collect imaging data from multiple sources, including but not limited to digital photographs, remote sensing maps, and scanning electron microscope (SEM) images. The collected data sources represent distinct scales and resolutions of geological features relevant to lithofacies analysis.

At step 504, a first CNN model 126 is applied to the digital photographs to extract spatial features that characterize surface-level lithological textures and patterns. The first CNN model 126 includes multiple convolutional and pooling layers trained to capture edge, color, and morphological information.

At step 506, a second CNN model 128 is applied to the remote sensing maps to extract geospatial and spectral features that are indicative of mineral compositions and regional geological structures. The second CNN model 212 is pre-trained on remote sensing datasets and fine-tuned for lithofacies-related tasks.

At step 508, a third CNN model 130 is employed to extract microstructural features from SEM images, which represent high-resolution subsurface views of rock and mineral grains. The model 214 captures fine-grained textures, pore structures, and mineral boundaries.

At step 510, an output layer 134 combines the extracted features from the first CNN model 126, the second CNN model 128, and the third CNN model 130 into a unified representation. For the unification, the system 100A employs concatenation, attention-based weighting, or transformation mechanisms to align and integrate features across different imaging modalities.

At step 512, the 1D-CNN model 136 is utilized to further extract temporal or sequential patterns from the combined feature representation. The 1D-CNN model 136 performs only one-dimensional convolutions and is configured to refine the imaging features in the context of exploration sequences or depth-indexed image sets.

At step 514, the NN classifier 138 receives the features output by the 1D-CNN model 136 and predicts lithofacies classes along with corresponding composition percentages. The NN classifier 138 includes dense layers and a softmax or sigmoid output layer trained on labeled lithofacies data.

At step 516, an output device 144 generates an exploration decision based on the predicted lithofacies classes. The decision may include recommendations for target drilling zones, mineral prospectivity assessments, or further sampling operations.

The process flow 500 enables a hierarchical, deep learning-based approach to multimodal image analysis for lithofacies classification and supports data-driven exploration decision-making with improved resolution and accuracy.

Figure 6:
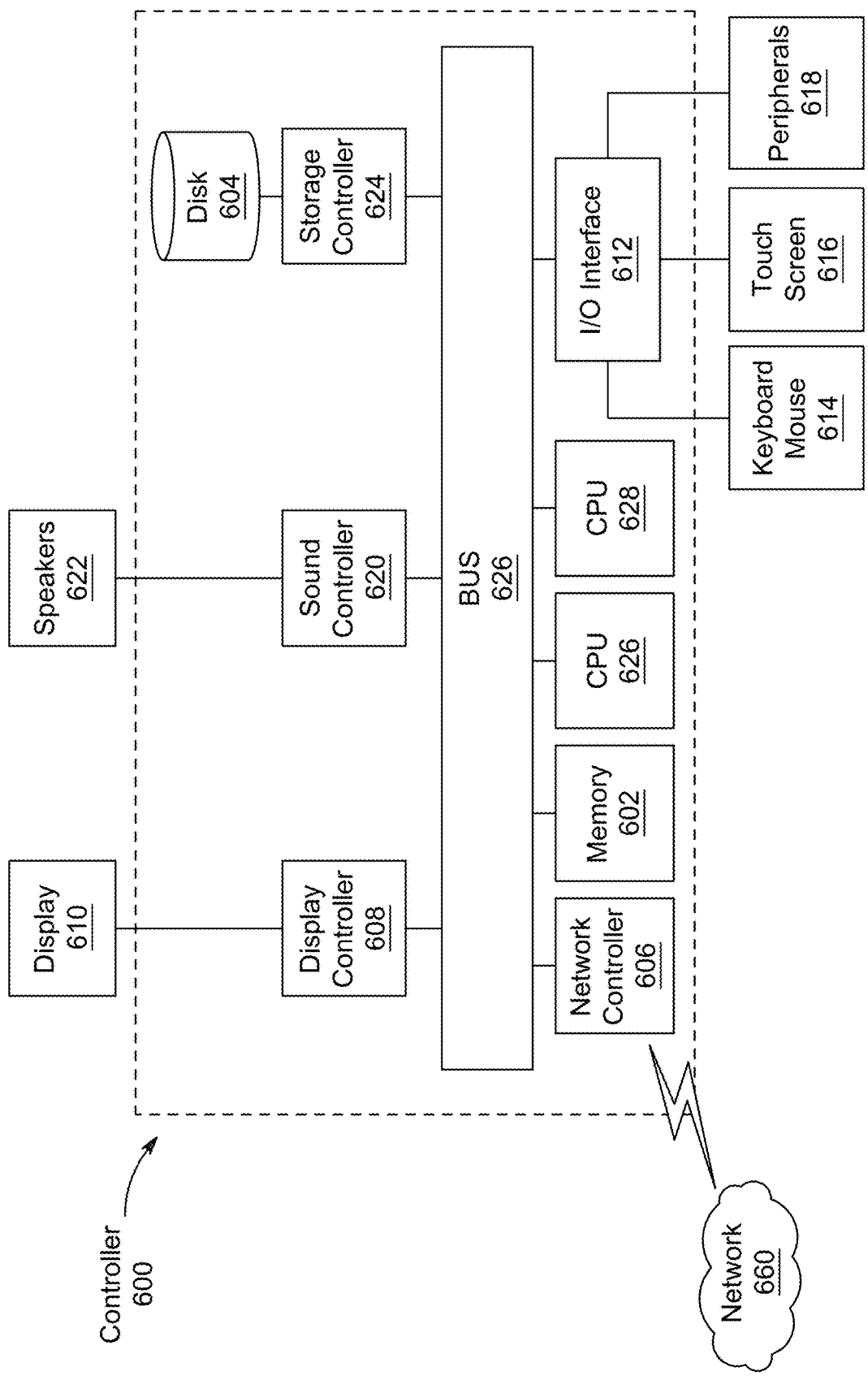
FIG. 6 is an illustration of a non-limiting example of details of computing hardware used in the computing system, according to certain embodiments.

Next, further details of the hardware description of the computing environment according to exemplary embodiments are described with reference to FIG. 6. In FIG. 6, a controller 600 is described as representative of system 100A in which the controller is a processing circuit 124 which includes a CPU 626 which performs the processes described above/below. The process data and instructions may be stored in memory 602. These processes and instructions may also be stored on a storage medium disk 604 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 626, 628 and an operating system such as Microsoft Windows 6, Microsoft Windows 9, UNIX, LINUX, Apple MAC-OS and other systems known to those skilled in the art.

The hardware elements to achieve the computing device may be realized by various circuitry elements, known to those skilled in the art. For example, CPU 626 or CPU 628 may be a Xenon or Core processor from Intel of America or an Opteron processor from AMD of America, or may be other processor types that would be recognized by one of ordinary skill in the art.

Alternatively, the CPU 626, 628 may be implemented on an FPGA, ASIC, PLD or using discrete logic circuits, as one of the ordinary skill in the art would recognize. Further, CPU 626, 628 may be implemented as multiple processors cooperatively working in parallel to perform the instructions of the inventive processes described above.

The computing device in FIG. 6 also includes a network controller 606, such as an Intel Ethernet PRO network interface card from Intel Corporation of America, for interfacing with network 660. As can be appreciated, the network 660 can be a public network, such as the Internet, or a private network such as an LAN or WAN network, or any combination thereof and can also include PSTN or ISDN subnetworks.

The network 660 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general-purpose storage controller 624 connects the storage medium disk 604 with communication bus 630, which may be an ISA, EISA, VESA, PCI, or similar, for interconnecting all of the components of the computing device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 7.

Figure 7:
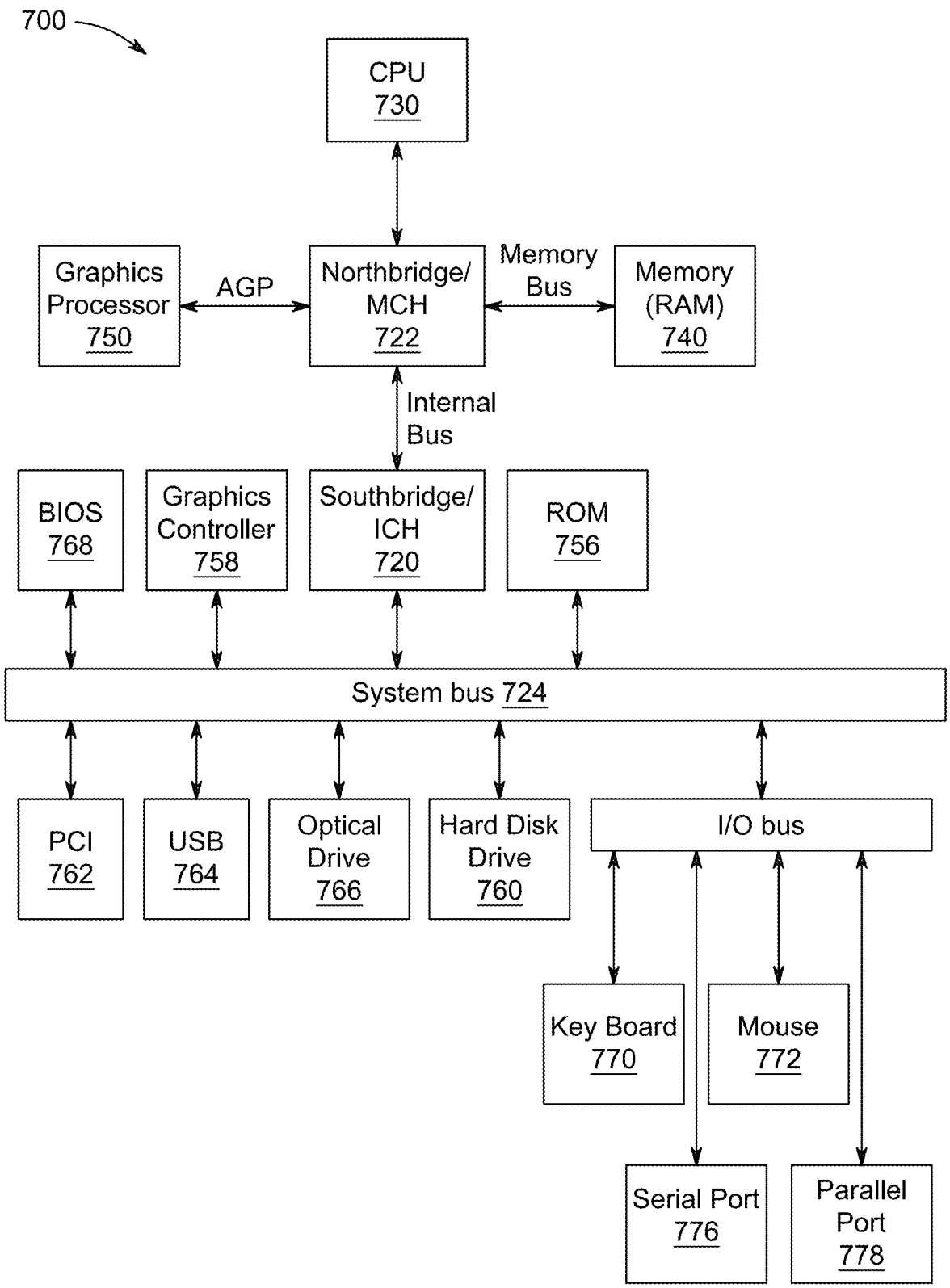
FIG. 7 is an exemplary schematic diagram of a data processing system used within the computing system, according to certain embodiments.

FIG. 7 shows a schematic diagram of a data processing system, according to certain embodiments, for performing the functions of the exemplary embodiments. The data processing system is an example of a computer in which code or instructions implementing the processes of the illustrative embodiments may be located.

In FIG. 7, data processing system 700 employs a hub architecture including a north bridge and memory controller hub (NB/MCH) 722 and a south bridge and input/output (I/O) controller hub (SB/ICH) 720. The central processing unit (CPU) 730 is connected to NB/MCH 722. The NB/MCH 722 also connects to the memory 740 via a memory bus, and connects to the graphics processor 750 via an accelerated graphics port (AGP).

The NB/MCH 722 also connects to the SB/ICH 720 via an internal bus (e.g., a unified media interface or a direct media interface). The CPU Processing unit 730 may contain one or more processors and even may be implemented using one or more heterogeneous processor systems.

Figure 8:
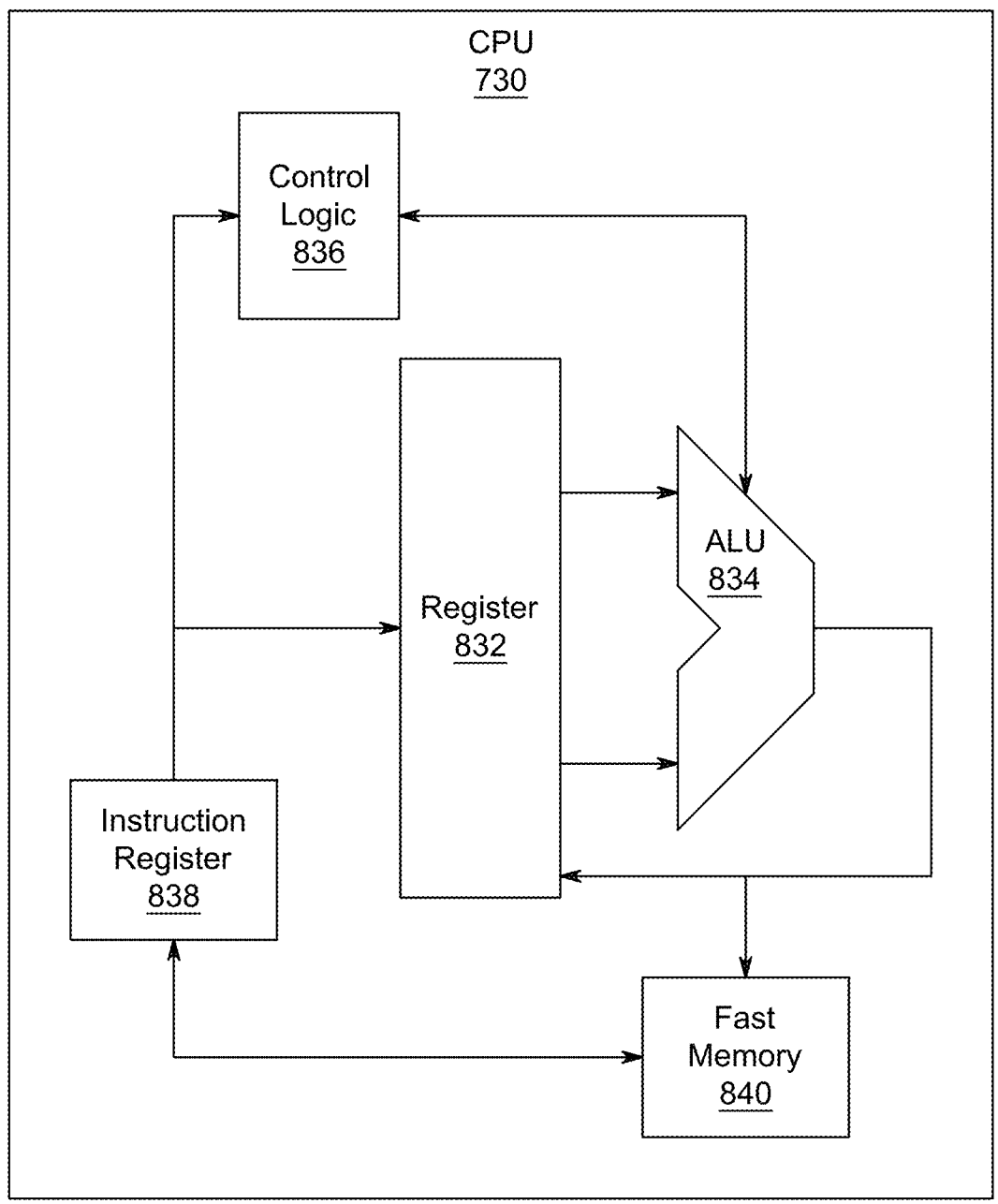
FIG. 8 is an exemplary schematic diagram of a processor used with the computing system, according to certain embodiments.

For example, FIG. 8 shows one implementation of CPU 730. In one implementation, the instruction register 838 retrieves instructions from the fast memory 840. At least part of these instructions is fetched from the instruction register 838 by the control logic 836 and interpreted according to the instruction set architecture of the CPU 730. Part of the instructions can also be directed to the register 832.

In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions.

The results from these operations can be feedback into the register and/or stored in the fast memory 840. According to certain implementations, the instruction set architecture of the CPU 730 can use a reduced instruction set architecture, a complex instruction set architecture, a vector processor architecture, and a very large instruction word architecture. Furthermore, the CPU 730 can be based on the Von Neuman model or the Harvard model.

The CPU 730 can be a digital signal processor, an FPGA, an ASIC, a PLA, a PLD, or a CPLD. Further, the CPU 730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 720 is coupled through a system bus 724 to an I/O Bus, a read only memory (ROM) 756, universal serial bus (USB) port 764, a flash binary input/output system (BIOS) 768, and a graphics controller 758. PCI/PCIe devices can also be coupled to SB/ICH 788 through a PCI bus 762.

The PCI devices may include, for example, Ethernet adapters, add-in cards, and PC cards for notebook computers. The Hard disk drive 760 and CD-ROM 766 can use, for example, an integrated drive electronics (IDE) or serial advanced technology attachment (SATA) interface. In one implementation the I/O bus can include a super I/O (SIO) device.

Further, the hard disk drive (HDD) 760 and optical drive 766 can also be coupled to the SB/ICH 720 through a system bus 724. In one implementation, a keyboard 770, a mouse 772, a parallel port 778, and a serial port 776 can be connected to the system bus 724 through the I/O bus.

Other peripherals and devices that can be connected to the SB/ICH 720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network.

Figure 9:
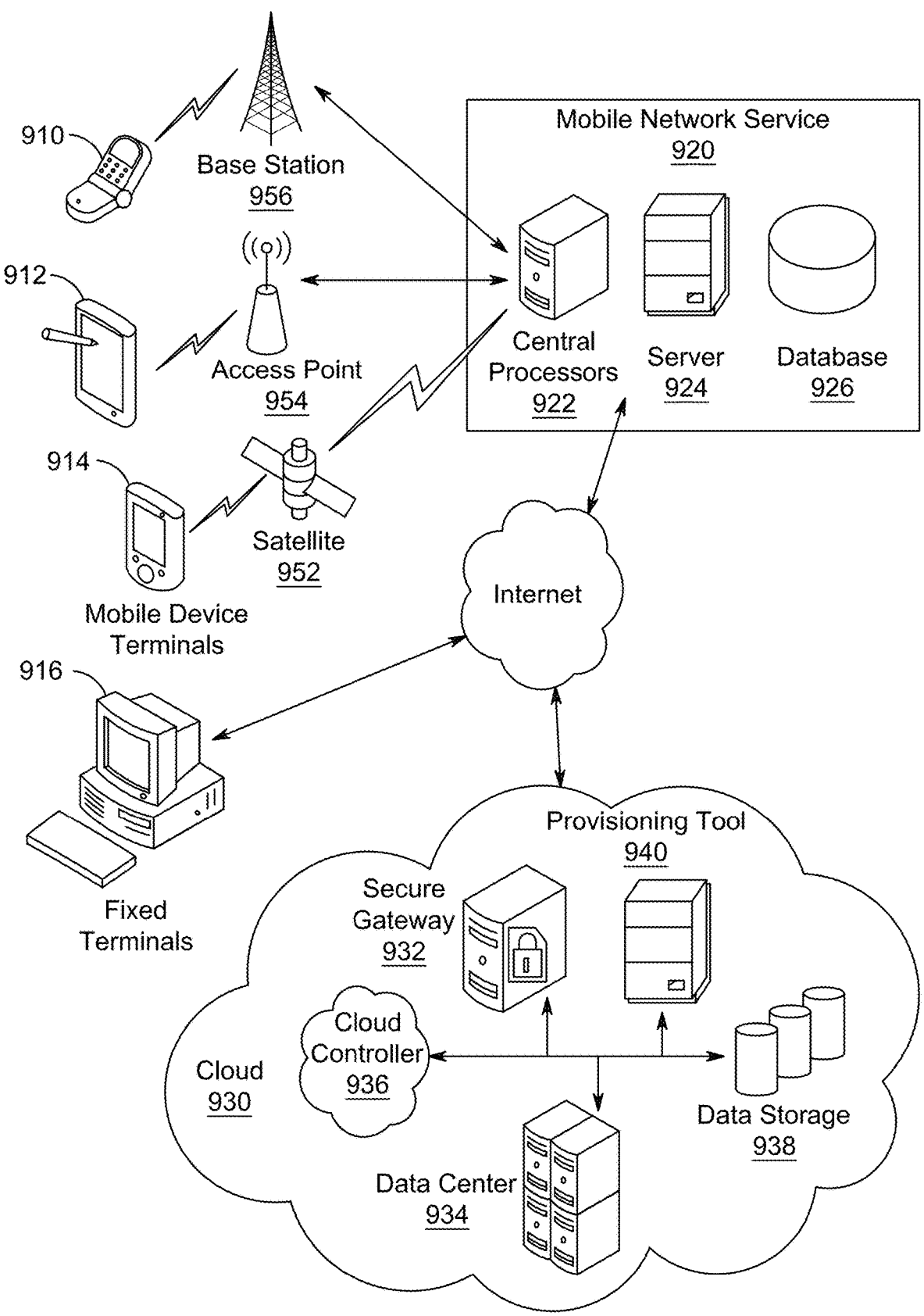
FIG. 9 is an illustration of a non-limiting example of distributed components which may share processing with the controller, according to certain embodiments.

The distributed components may include one or more client and server machines, which may share processing, as shown by FIG. 9, in addition to various human interface and communication devices (e.g., display monitors, smart phones, tablets, personal digital assistants (PDAs)). More specifically, FIG. 9 illustrates client devices including a smart phone 911, a tablet 912, a mobile device terminal 914 and fixed terminals 916.

These client devices may be commutatively coupled with a mobile network service 920 via a base station 956, an access point 954, a satellite 952 or via an internet connection. The mobile network service 920 may comprise central processors 922, a server 924 and a database 926. The fixed terminals 916 and the mobile network service 920 may be commutatively coupled via an internet connection to functions in cloud 930 that may comprise a security gateway 932, a data center 934, a cloud controller 936, a data storage 938 and a provisioning tool 940.

The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A system for exploring an underground reservoir based on multimodal lithofacies identification, the system comprising:

a drilling machine positioned at a location being explored;

an image data acquiring device, further comprising a digital camera for capturing digital photos, a remote sensing map generating device for generating remote sensing maps, and a scanning electron microscope (SEM) image generating device for generating SEM images, wherein the digital camera further comprises a camera arranged on the drilling machine and a camera-equipped drone arranged in a vicinity of the drilling machine, the remote sensing map generating device further comprises a hyperspectral remote sensing device and a synthetic-aperture radar, and the SEM image generating device further comprises an SEM device equipped with an energy-dispersive X-ray spectroscopy device:

a waveform signal data acquiring device, further comprising a downhole logging device for acquiring well log data obtained within a borehole drilled using the drilling machine and a seismometer for acquiring seismic data in the vicinity of the drilling machine:

a data collection interface for collecting data from the image data acquiring device and the waveform signal data acquiring device, including the digital photos, the remote sensing maps, the SEM images, the well log data, and the seismic data, and preprocessing the collected data:

a data storage communicatively coupled to the data collection interface, configured to store the preprocessed data received from the data collection interface; and processing circuitry communicatively coupled to the data collection interface, configured to make an exploration decision on a drilling operation of the drilling machine, based on the preprocessed data received from the data collection interface, wherein the processing circuitry further comprises:

a first convolutional neural network (CNN) model to extract visual features from the digital photos, a second (CNN) model to extract spatial-spectral features from the remote sensing maps, a third (CNN) model to extract microstructural features from the SEM images, a statistical feature module to extract statistical features from the seismic data and the well log data, a rule-based engine to filter the extracted statistical features based on a predetermined rule to obtain filtered statistical features, an output feature layer to combine the features extracted by each of the first, second and third CNN models to obtain combined imaging features, and merge the combined imaging features with the filtered statistical features to generate a merged feature set, a 1-D CNN model configured to extract further features from the merged feature set, wherein the 1-D CNN performs only 1D convolutions on arrays, a Neural Network (NN) classifier that takes the further features that are output from the 1-D CNN model to predict lithofacies classes along with respective composition percentages, a decision logic module that makes the exploration decision based on the predicted lithofacies classes and the composition percentages of the predicted lithofacies classes, and an output device configured to output the exploration decision, based on the exploration decision from the output device, the drilling machine performs the drilling operation, and the predetermined rule includes one or more of: a statistical property based rule for selecting those statistical features that have a statistical property exceeding a predetermined threshold, a redundancy elimination rule for removing those statistical features that have an inter-feature correlation exceeding a predetermined threshold, a information gain based rule for selecting those statistical features that have an uncertainty reduction contribution exceeding a predetermined threshold, a domain specific heuristic rule for filtering the statistical features based on a pre-developed knowledge, and a context aware adaptive rule for filtering the statistical features based on a dynamic adaptive parameter.

2. The system of claim 1 wherein the statistical feature module is further configured to extract the statistical features from the seismic data and the well log data through application of power transform, feature interaction, and wavelets transformation.

3. The system of claim 1, wherein the output feature layer is further configured to obtain the combined imaging features by performing one or more of feature concatenation, attention-weighted averaging, and canonical correlation analysis on the features extracted by the first, second and third CNN models.

4. The system of claim 1, wherein the 1-D CNN model is further configured to reduce the further features through flattening and densing layers, and a softmax function.

5. The system of claim 1, wherein the output of the NN classifier includes 12 (twelve) pre-defined classes, including Sandstone, Sandstone/Shale, Shale, Marl, Dolomite, Limestone, Chalk, Halite, Anhydrite, Tuff, Coal, and Basement, and relative percentages of each class.

6. The system of claim 1, wherein the exploration decision includes one or more of: a decision to initiate, delay, or abandon the drilling operation, a depth interval for coring, and a potential region of the underground reservoir.

7. The system of claim 1, wherein the data collection interface is further configured to perform the preprocessing by normalizing and formatting the data collected from the image data acquiring device.

8. The system of claim 1, applying sampling, noise filtering, and interpolation to the data collected from the waveform signal data acquiring device.

9. The system of claim 1, wherein the downhole logging device is configured to acquire the well log data in a real time mode while the drilling machine is drilling the borehole, or in a wireline logging mode.

10. The system of claim 1, wherein the data storage is a cloud data server or a local storage device.

11. A method for exploring an underground reservoir based on multimodal lithofacies identification, comprising:

positioning a drilling machine at a location being explored;

using an image data acquiring device to acquire image data, wherein the image data acquiring device further comprises a digital camera for capturing digital photos, a remote sensing map generating device for generating remote sensing maps, and a scanning electron microscope (SEM) image generating device for generating SEM images, the digital camera further comprises a camera arranged on the drilling machine and a camera-equipped drone arranged in a vicinity of the drilling machine, the remote sensing map generating device further comprises a hyperspectral remote sensing device and as synthetic-aperture radar, and the SEM image generating device further comprises an SEM device equipped with an energy-dispersive X-ray spectroscopy device;

using a waveform signal data acquiring device to acquire waveform signal data, wherein the waveform signal data acquiring device further comprises a downhole logging device for acquiring well log data obtained within a borehole drilled using the drilling machine and a seismometer for acquiring seismic data in the vicinity of the drilling machine;

collecting, by a data collection interface, data from the image data acquiring device and the waveform signal data acquiring device, including the digital photos, the remote sensing maps, the SEM images, the well log data, and the seismic data, and preprocessing the collected data;

via a data storage communicatively coupled to the data collection interface, storing the preprocessed data received from the data collection interface;

via processing circuitry communicatively coupled to the data collection interface, making an exploration decision on a drilling operation of the drilling machine, based on the preprocessed data received from the data collection interface; and via the drilling machine, performing the drilling operation based on the exploration decision, wherein the processing circuitry further comprises:

a first convolutional neural network (CNN) model to extract visual features from the digital photos, a second (CNN) model to extract spatial-spectral features from the remote sensing maps, a third (CNN) model to extract microstructural features from the SEM images, a statistical feature module to extract statistical features from the seismic data and the well log data, a rule-based engine to filter the extracted statistical features based on a predetermined rule to obtain filtered statistical features, an output feature layer to combine the features extracted by each of the first, second and third CNN models to obtain combined imaging features, and merge the combined imaging features with the filtered statistical features to generate a merged feature set, a 1-D CNN model configured to extract further features from the merged feature set, wherein the 1-D CNN performs only 1D convolutions on arrays, a Neural Network (NN) classifier that takes the further features that are output from the 1-D CNN model to predict lithofacies classes along with respective composition percentages, a decision logic module that makes the exploration decision based on the predicted lithofacies classes and the composition percentages of the predicted lithofacies classes, and an output device configured to output the exploration decision, and the predetermined rule includes one or more of:

a statistical property based rule for selecting those statistical features that have a statistical property exceeding a predetermined threshold, a redundancy elimination rule for removing those statistical features that have an inter-feature correlation exceeding a predetermined threshold, a information gain based rule for selecting those statistical features that have an uncertainty reduction contribution exceeding a predetermined threshold, a domain specific heuristic rule for filtering the statistical features based on a pre-developed knowledge, and a context aware adaptive rule for filtering the statistical features based on a dynamic adaptive parameter.

12. The method of claim 11, wherein
the statistical feature module is further configured to extract the statistical features from the seismic data and the well log data through application of power transform, feature interaction, and wavelets transformation.

13. The method of claim 1, wherein the output feature layer is further configured to obtain the combined imaging features by performing one or more of feature concatenation, attention-weighted averaging, and canonical correlation analysis on the features extracted by the first, second and third CNN models.

14. The method of claim 11, further comprising reducing the further features through flattening and densing layers, and a softmax function.

15. The method of claim 11, further comprising outputting, by the NN classifier, 12 (twelve) pre-defined classes, including Sandstone, Sandstone/Shale, Shale, Marl, Dolomite, Limestone, Chalk, Halite, Anhydrite, Tuff, Coal, and Basement, and relative percentages of each class.

16. The method of claim 11, wherein the exploration decision includes one or more of: a decision to initiate, delay, or abandon the drilling operation, a depth interval for coring, and a potential region of the underground reservoir.

17. The method of claim 11, wherein the data collection interface is further configured to perform the preprocessing by normalizing and formatting the data collected from the image data acquiring device.

18. The method of claim 11, wherein the data collection interface is further configured to perform the preprocessing by applying sampling, noise filtering, and interpolation to the data collected from the waveform signal data acquiring device.

19. The method of claim 11, wherein the downhole logging device is configured to acquire the well log data in a real time mode while the drilling machine is drilling the borehole, or in a wireline logging mode.

20. The method of claim 1, wherein the data storage is a cloud data server or a local storage device.

* * * * *